United States Patent [19]

Dörries et al.

[11] Patent Number: 4,533,590
[45] Date of Patent: Aug. 6, 1985

[54] CARRIER MATERIALS COATED WITH AMINO RESIN DISPERSIONS, AND THEIR FURTHER PROCESSING INTO LAMINATES

[75] Inventors: Peter Dörries, Frankfurt am Main; Helmut Wahl, Düsseldorf, both of Fed. Rep. of Germany

[73] Assignees: Cassella Aktiengesellschaft, Frankfurt am Main; Theodor Hymmen KG, Bielefeld, both of Fed. Rep. of Germany

[21] Appl. No.: 615,374

[22] Filed: May 30, 1984

Related U.S. Application Data

[62] Division of Ser. No. 473,969, Mar. 10, 1983.

[30] Foreign Application Priority Data

Mar. 11, 1982 [DE] Fed. Rep. of Germany ....... 3208728

[51] Int. Cl.³ ............................ B32B 3/00; B32B 7/00; B32B 29/00
[52] U.S. Cl. ..................................... 428/211; 428/254; 428/264; 428/530; 428/537.5
[58] Field of Search ............... 428/211, 254, 264, 530, 428/537.5

[56] References Cited

U.S. PATENT DOCUMENTS

| | | |
|---|---|---|
| 2,744,047 | 5/1956 | Ingrassia et al. |
| 3,959,201 | 5/1976 | Chang. |
| 4,076,896 | 2/1978 | Bunkowski ........................ 428/530 |
| 4,123,579 | 10/1978 | McCaskey .......................... 428/264 |
| 4,195,116 | 3/1980 | Anderson et al. |
| 4,424,261 | 1/1984 | Keeling et al. ..................... 428/530 |

FOREIGN PATENT DOCUMENTS

| | | |
|---|---|---|
| 0036176 | 3/1981 | European Pat. Off. |
| 0088978 | 3/1983 | European Pat. Off. |
| 2248450 | 4/1973 | Fed. Rep. of Germany. |
| 1280365 | 11/1961 | France. |
| 2291011 | 6/1976 | France. |
| 0162213 | 6/1933 | Switzerland. |
| 0377102 | 6/1964 | Switzerland. |
| 0371481 | 4/1932 | United Kingdom. |
| 1285551 | 8/1972 | United Kingdom. |

*Primary Examiner*—Lucille M. Phynes
*Attorney, Agent, or Firm*—Connolly and Hutz

[57] ABSTRACT

A carrier web coated with amino resin wherein at least one surface is resinated is produced by applying a spreadable amino resin dispersion containing 70–90% by weight of amino resin and 30–10% by weight of a liquid dispersant to at least one surface of an uncoated carrier web in an apparatus comprising:

(a) unwinding station for unwinding uncoated carrier webs from rotatable supply rolls,
(b) means for conveying the uncoated webs comprising a plurality of cooperating pressure rolls rotatably mounted in parallel relationship,
(c) a coating means for applying a brushable amino resin dispersion to the web, and
(d) a belt press for compression-molding and curing the coated web.

4 Claims, 5 Drawing Figures

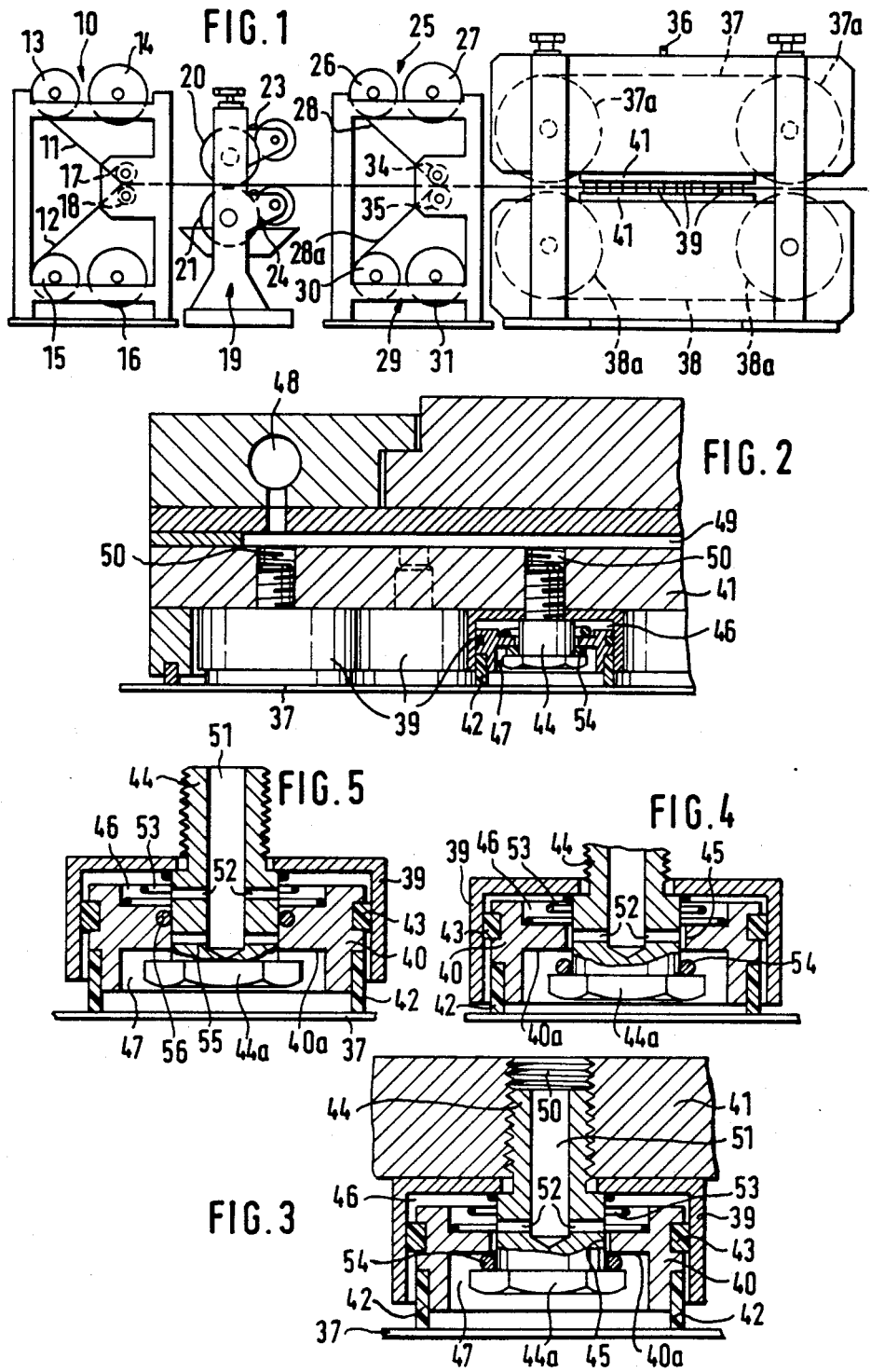

CARRIER MATERIALS COATED WITH AMINO RESIN DISPERSIONS, AND THEIR FURTHER PROCESSING INTO LAMINATES

This is a division of application Ser. No. 473,969 filed on Mar. 10, 1983.

The present invention relates to carrier webs, in particular those made of web-like materials, such as, for example, paper or woven or knitted fabrics, which have been coated with spreadable amino resin dispersions.

The invention also relates to the processing of carrier materials thus coated into surface-finished materials, in particular wooden materials, or into laminated plastics, and thus relates to a novel, particularly economical process for preparing such materials with a protective and/or decorative surface finish.

It is known to use heat-curable amino resins for preparing wooden materials with protective and/or decorative surfaces and for preparing laminated plastics. Materials of this type are used for many and varied purposes in industry, in particular in furniture manufacture and internal building work, and have thus attained very considerable importance.

In surface-finishing wooden materials, a decorative and/or protective layer is applied to wood fibre or wood chipboards by impregnating decorative paper or fabric webs with aqueous solutions of suitable amino resins, preferably melamine resins, drying them to a certain volatile content, and laminating them onto the boards of the wooden material by means of a thermal hardening step during which the compression-moulding pressure can be about 10 to 100 bar (1 bar = $10^5$ Pa = 1 kg/cm$^2$) and the temperature about 120° to 180° C. The aminoplast hardens during the compression-moulding step, and bonds the paper or fabric web to the board of the wooden material.

Laminates having a decorative and/or protective surface can be prepared in a similar manner, by pressing by means of thermal hardening the decorative web, after it has been impregnated with amino resin and then dried, onto several layers of kraft paper which has been impregnated with phenolic resin. In this method the compression-moulding pressures are within a range from about 50 to 150 bar, and the compression-moulding temperatures are usually about 120° to 180° C. To increase the scratch and abrasion resistance, the decorative web is covered before the compression-moulding step with transparent overlay paper which has been impregnated with amino resin. In some cases, use is also made of a layer of barrier paper between decorative web and core and a layer of backing paper on the reverse face. Melamine/formaldehyde resins are preferably used for impregnating the overlay web and the decorative web. Overlay and barrier papers can also be used in surface-finishing wooden materials.

The subsequent compression-moulding is carried out by various generally customary methods. Thus, for example, multidaylight presses are used, pressing taking place at 120° to 160° C. in the course of about 5 to 10 minutes and temperatures being lowered to 70° to 100° C. before the boards are removed. By using this method, it is already possible to prepare surfaces having a very high degree of sheen, even if known resins are used. A disadvantage is the long time taken for heating up and cooling down, which leads to long press cycles and increases the costs of the method. In the so-called short-time method only one daylight space is compressed at any one time. In this method pressing takes place at 120° to 160° C. within only 30 to 120 seconds, and the product is extracted without the press having been cooled down. Although this press cycle is short and relatively inexpensive, it has so far been impossible using known resins to produce the same high surface sheen as in the multi-daylight process with cooling down.

A new production method is the continuous manufacture of so-called continuous melamine laminates on twin-belt presses. In this method, the decorative web is held between two steel belts and pressed under pressure (10 to 30 bar) and heat (130° to 170° C.) onto a suitable carrier material, such as, for example, vulcanised fibre, or so-called furniture parchments.

The processing of aminoplasts by hot-pressing transforms soluble and fusible aminoplast precondensates into infusible and insoluble products. A crosslinking reaction takes place during this hardening process. However, the rate of this crosslinking reaction is as a rule too low for use in industry, even at the elevated processing temperatures used there, and must therefore be raised by adding hardening agents. In particular the short-cycle process can only be carried out in the presence of amounts of about 0.05 to 1% of effective hardening agents. Compounds which have an acidic reaction and/or split off an acid are used as hardening agents. Examples of such hardening agents are ammonium salts and amine salts, such as ammonium chloride, ammonium thiocyanate or ethanolamine hydrochloride, and strong organic acids, such as p-toluenesulphonic acid. The use of free acids or of salts which have strongly acidic reaction results in relatively short pot lives for the amino resin, which is thereby made more difficult to process.

The amino resins used for impregnating the carrier webs, which are frequently also referred to as aminoplast precondensates, are resinous products, or solutions thereof, which are formed by condensing amino- or imino-containing compounds with carbonyl compounds and, if desired, with a lower alkanol. (Compare Kunststoff-Handbuch [Plastics Reference Manual] volume X, Duroplaste [Thermosetting resins], published by C. Hanser VerLag Munich (1968); and Houben-Weyl, Methoden der organischen Chemie [Methods of organic chemistry] volume XIV/2, pages 357 et seq., published by G. Thieme Verlag Stuttgart (1963)).

Examples of known aminoplast-formers are melamine, urea, thiourea, dicyanodiamide, acetoguanamine, and benzoguanamine. Carbonyl compounds which are known to be suitable for the reaction with aminoplast-formers are aliphatic or aromatic aldehydes and ketones, such as, for example, formaldehyde, acetaldehyde, propionaldehyde, butyraldehyde, isobutylaldehyde, benzaldehyde, acetone, and methyl ethyl ketone. Mixtures of various amino-plast-formers various carbonyl compounds can also be used for preparing aminoplasts.

Urea and melamine are particularly advantageous and therefore frequently used aminoplast-formers; formaldehyde is the preferred carbonyl compound.

Lower alkanols which may be present during the reaction of aminoplast-formers with carbonyl compounds are those which have 1 to 6 C atoms; lower representatives of this group, namely ethanol and, in particular, methanol, are favoured for preparing so-called impregnating resins for the surface-finishing of, for example, wooden materials or laminated plastics.

The reaction between aminoplast-formers, carbonyl compounds and, if desired, an alkanol as a rule takes place in a predominantly aqueous medium within a weakly alkaline range, and is only allowed to proceed to a stage where the products are still soluble and fusible. As soon as this state has been reached the condensation is discontinued, for example by cooling down and bringing the reaction mixture to a weakly alkaline pH value. The aminoplasts thus prepared, which are not fully condensed and are therefore also referred to as aminoplast precondesates, are used in the form of their aqueous solutions, in particular as impregnating resins, in the laminated plastics industry and for surface-finishing wooden materials.

The most important characterising features of amino resins are the molar ration of aminoplast-former to, for example, formaldehyde and the degree of condensation, which is signified by the water-dilutability of the resin. Modern commercially available resins used for the purposes described above normally have aminoplast/formaldehyde molar ratios of 1:1.5 to 1:2.2 and water-dilutability of 1:0.5 to 1:2.0.

Industrially used amino resins, in addition to the aminoplast precondensate, frequently also contain so-called modifiers, which impart special properties to the resins or to the materials prepared from the resins. For instance, the resins can contain additives which lengthen the pot life, which starts when the hardening agent is added, uch as, for example, certain amines, or additives which increase sheen and resilience or further improve whether resistance. Other known additives affect the wetting properties of the resins or their flow and hardening characteristics.

Examples of known modifiers are the lower alkanols already mentioned, glycols, glycol ethers, sorbitol, sugar, caprolactam, methylenebisformamide, amidosulphonic acid, p-toluenesulphamide, and the like.

Amino resins are marketed either in the form of aqueous solutions having a solids content of about 50–60% by weight, namely as so-called "Liquid resins", or, after spray-drying, as anhydrous pulverulent resins, namely so-called "powder resins".

Pulverulent resins have been preferred in particular when the resins have to be transported over long distances to where they are to be used or when a particularly long shelf life is required.

The impregnation of the carrier webs, which is necessary in all known methods of processing amino resins, was hitherto effected exclusively by means of the so-called "dipping" in special, very expensive impregnating units. If pulverulent resins were used they first had to be dissolved in water. Only the clear, relatively low-viscosity solutions thus obtained were then used in the impregnation.

In conventional impregnating, the carrier webs, in addition to the resin, contain so much water that immediate further processing is impossible. For this reason, the impregnated webs always have to be dried between the impregnating step and the pressing step. They are as a rule dried in moving-product dryers which are connected in series, which drying is a very energy-consuming process because of the amount of water to be removed by drying and water's high heat of evaporation. In addition, the drying time required necessitates a relatively expensive drying unit and/or restriction of the production speed.

The amount of energy consumed in drying impregnated carrier webs constitutes a very substantial load on the overall production process especially when powder resins have to be used, since in this case the heat of evaporation has to be overcome twice: once in spray-drying the resin and once in drying the impregnated carrier web. However, even if production is carried out on the basis of liquid resins, that is of aqueous resin solutions as obtained in the preparation of the resin or only moderately concentrated resins, drying the impregnated carrier web is an awkward step, and can, in certain circumstances, be responsible for slowing down production. The overall economics of this drying step are also unfavourable, since drying the resins by means of spraying at the resin manufacturer's will as a rule consume less energy than drying the resinated carrier web at the processor's, not only for reasons of machine design but also for kinetic and thermodynamic reasons.

It has now been found that in processing amino resins into coated materials and laminates it is surprisingly possible to avoid the expensive impregnating of carrier webs and the energy- and time-consuming drying of the impregnated carrier webs when the carrier webs are coated with spreadable amino resin dispersions.

According to the invention, a particularly favourable way of preparing carrier webs which are resinated at the surface is to apply to the surface of the carrier a spreadable dispersion of a pulverulent amino resin and the liquid phase of which also contains or can also contain aminoplast precondensate which acts as an adhesion promoter.

The amount of resin dispersion applied to the carrier web depends, within certain limits, on the weight per unit area of the uncoated carrier material, namely on the so-called raw weight. As a rule the carrier webs are coated with an amount of dispersion which is equal to 50 to 150% by weight of the raw weight, preferably 70 to 140% by weight of the raw weight. Accordingly, the amount of dispersion applied to a carrier web with a weight per unit area of 100 g per $m^2$ is, for example, 50 to 150 g, preferably 70 to 140 g, per $m^2$.

The webs thus obtained can be further processed directly, that is without intermediate drying, in a conventional manner by hot-pressing.

The present invention also relates to a process for preparing coated materials, in particular wooden materials and laminated plastics, by using web- or fabric-like carrier webs resinated according to the invention and subsequently pressing them onto the material to be coated, in particular wooden material, or jointly compression-moulding several resinated carrier webs, in particular decorative and core webs, into laminated plastics under the influence of heat.

In addition to immediately further processing the carrier webs according to the invention, which have been coated on the surface with spreadable amino resin dispersions, it is also possible to lay in stocks of these carrier webs, which are further processed as required, at various places and at various times. This method of working requires the interposition of separating (release) films.

The webs resinated at the surface with spreadable amino resin dispersions only contain a very small amount of moisture, in particular water, so that even short drying in the air without the supply of additional heat leads to non-tacky surfaces and products which can be stored. It is of course also possible to supply energy and thus accelerate the evaporation of the small amount of water present. However, the energy consumed is in this case minimal. However, it is without doubt particularly economical to combine the surface resination of the carrier web with the immediately subsequent further processing through conventional compression-moulding, since it is in this way possible completely to dispense with an intermediate drying step.

The carrier webs coated at the surface with amino resin are prepared by applying spreadable amino resin dispersions to the surface of the carrier web. In principle the resin can be applied to both sides of the carrier web; but it is advantageous, and without any disadvantage as regards further processing, to apply the resin only to one side of the carrier web, preferably the upper side. The resin dispersion can in principle be applied in any manner which is known for the uniform application of spreadable dispersions to sheet-like structures. For instance, the resin dispersion can be manually brushed on or spread on, preferably by means of a serrated spatula. The application by machine, of advantage in production processes, can be effected, for example, by means of a roll with metering by doctor blade.

The spreadable amino resin dispersions used according to the invention consist of 70 to 90% by weight of amino resin and to 30 to 10% by weight of a liquid phase, preferably water.

The spreadable dispersions preferably consist of 75 to 85% by weight of resin and 25 to 15% by weight of water. Accordingly, to prepared 100 parts by weight of these dispersions 70 to 90 parts by weight, preferably 75 to 85 parts by weight, of a pulverulent amino resin can be homogenised with 30 to 10 parts by weight, preferably 25 to 15 parts by weight, of the liquid phase, preferably water. If a liquid amino resin solution (so-called liquid resin) is used as the liquid phase, the amounts of powder resin and liquid resin to be homogenised are calculated in such a way according to the resin content of the liquid resin that the abovementioned composition of the resin dispersion to be used according to the invention is obtained. Thus, for example, spreadable amino resin dispersions according to the invention can be prepared by homogenising per 100 parts by weight of dispersion 35 to 65 parts by weight, preferably 50 to 42 parts by weight, of amino resin powder with 65 to 35 parts by weight, preferably 50 to 58 parts by weight, of an aqueous aminoplast liquid resin having a resin content of 50 to 65% by weight. The amino resin content is then obtained by summing the amount of powder resin and the resin content contained in the liquid resin.

Preferred spreadable amino resin dispersions are those which contain the resin powder in a state of dispersion in an amino resin solution (liquid resin). They are highly viscous to pasty homogenised amino resin dispersions. The liquid phase for the dispersions can be not only water or aqueous amino resin solution but also other liquids which completely or incipiently dissolve the powder resin, such as, for example, mixtures of water with low-boiling water-soluble organic solvents.

What the most desirable physical macroscopic state is for the dispersion depends to a certain extent on the method of application. If the dispersions are brushed on or spread on they can be pasty and contain a very small amount of liquid, while machine application by rolls and, if desired, doctor blades favours viscoelastic dispersions which contain somewhat more liquid. The dispersions preferably have an apparent viscosity of 10,000 to 14,000 mpa.s within the shear range from 16.5 to 1.5 sec $^{-1}$.

A suitable powder resin for preparing amino resin dispersions according to the invention is almost any plastified, pulverulent aminoplast precondensate which has not yet been fully hardened, that is which is still fusible, and thus virtually a majority of the commercially available amino resin types which are suitable for preparing coated materials and laminated plastics using the conventional process. Similarly, commercially available impregnating resins can be used as liquid resins in the preparation of the resin dispersions according to the invention.

Such commercially available powder and liquid resins have as a rule a molar ratio of aminoplast-former to formaldehyde of 1:1.5 to 1:2.2, preferably 1:1.6 to 1:1.8, and water-dilutability within the range from 1:0.8 to 1:1.5.

The amino resins used for preparing spreadable resin dispersions to be used according to the invention are predominantly based on melamine or urea as the aminoplast-former. Even mixed resins which contain melamine and urea as aminoplast-formers are suitable. Resins based on pure melamine/formaldehyde precondensates which can, if desired, also contain known modifiers are particularly useful and highly suitable for preparing high-quality end products.

Powder resins can be homogenised with the liquid phase desired in a conventional manner, for example in stirred or kneading units.

Any customary web-like or woven or knitted sheet-like structures are suitable for use as a carrier material in the preparation of surface-resinated carrier webs according to the invention. In particular, virtually any conventional plain and printed decorative paper having a raw weight of 40 to 200 g/m$^2$, commercially available core paper, for example soda kraft paper, and, to a limited extend, overlay paper (20–40 g/m$^2$) can be processed.

Those paper grades are also highly suitable which, while in the pupl state during their manufacture, have already been finished so as to be substantially non-splitting.

The carrier webs according to the invention, which are coated with a spreadable amino resin dispersion, can be processed merely by using known and conventional methods, either immediately, without intermediate drying, or after storage. Thus, for example, a pack of 2 to 6 carrier webs is continually compression-moulded under the influence of pressure and heat on twin-belt presses into laminated plastics intended for decorative or industrial use.

The carrier webs can also be processed in multi-daylight and, in particular, so-called short-cycle presses, for example in the form of a design which comprises 1 to 3 layers (decorative and underlay films) and which is intended for surface-coating wooden materials. In the course of the coating step the flow of the resin in the amino resin dispersion forms a protective surface and brings about optimal adhesion to the core material or carrier board.

It was very surprising that resin flow during the short transition period from still fusible aminoplast precondensate to infusible, thermoset resin is sufficient to produce a completely homogeneous, non-splitting laminated product.

A further unexpected benefit of using carrier materials according to the invention, which are surface-coated with spreadable amino resins, is that the laminated products obtained, in particular laminated plastics produced therefrom, are highly flexible, a feature unknown in the case of thermoset laminates. The novel spreadable amino resin dispersions themselves can also be applied as a top coat to decorative papers which have been pre-impregnated by know methods, for example with melamine resin, and then dried and which have raw weights of 50–150 g/m² or to pre-impregnated cardboard having raw weights of 150–350 g/m².

The examples which follow illustrate the present invention. They can of course also be varied within the definition of the above disclosure and in accordance with general know-how.

EXAMPLE 1

80 parts of a modified commercially available melamine/formaldehyde short-cycle resin in powder form (molar ratio of melamine to formaldehyde = 1:1.8) and 20 parts of demineralised water were dispersed by means of a high-speed stirrer to give a clot-free resin dispersion. Viscosity at 23° C.: about 12,000 to 14,000 mpa.s. 0.7% of the morpholine salt of para-toluenesulphonic acid, as a hardening agent, and 0.5% of a commercially available wetting agent were added to this dispersion.

The pot life of the dispersion at 20° to 25° C. was about 8 to 10 hours. The batch described above was applied by means of a roll with doctor blade metering (100 or 150μ) to the upper face of the following commercially available types of decorative paper or fabric webs:

(a) Sapeli woodgrain-printed decorative paper
  Raw weight: 65 g/m²
  Final weight, including dispersion: 140 g/m²
(b) White decorative paper
  Raw weight: 80 g/m²
  Final weight, including dispersion: 170 g/m²
(c) Grey decorative paper printed with a linen pattern
  Raw weight: 120 g/m²
  Final weight, including dispersion: 250 g/m²
(d) Cotton fabric
  Raw weight: 200 g/m²
  Final weight, including dispersion: 440 g/m²
(e) Core paper already finished in the course of its manufacture so as to be non-splitting
  Raw weight: 190 g/m²
  Final weight, including the coat of resin dispersion: 350 g/m²
(f) Regenerated paper
  Raw weight: 140 g/m² (used as an underlay film)
  Final weight, including the coat of resin dispersion: 290 g/m²

(b) The individual layers of paper were immediately compression-moulded once the dispersion had been applied, that is they were not dried in between.

(b 1) Sequence of layers for preparing a laminate: Platen (silk gloss) or aluminium foil or textured paper Decorative paper or fabric (grade a–d) with the resinated side facing upwards
  Regenerated paper (grade f)
  Core paper (grade e)
  Platen Compression-moulding conditions: 25 to 35 seconds at 155°–150° C., measured at the decorative paper under a moulding pressure of 25–30 bar.

Result:
Laminates were obtained which were void-free and non-splitting and had a homogeneous continuous surface.

The degree of hardening was examined by means of the Kiton dyeing test, the result, which was at level 2, being within the usual range. The steam resistance test and the crack resistance test, which were both carried out in accordance with prescribed methods, namely DIN 53,799 and DIN 68,765 respectively, satisfied the requirements.

(b 2) Sequence of Layers for preparing a laminate using vulcanised fibre or furniture parchment as core layer:
  Structural paper or aluminium foil
  Decorative paper or fabric (grade a–d) with the resinated side facing the structural paper
  Vulcanised fibre or furniture parchment
  Regenerated paper (grade f)—resinated side facing the vulcanised fibre layer Processing conditions in a twin-belt press:
  Residence time under pressure and heat: about 20 seconds, which corresponds to a linear speed of 6 m/min. The temperature at the two moulding belts was 160°–165° C.
  Moulding pressure: 12–15 bar.

Result:
Laminates were obtained which were void-free and non-splitting and had a homogeneous continuous surface.

The degree of hardening was examined by means of the Kiton dyeing test, the result, which was at level 2, being within the usual range.

The steam resistance test and the crack resistance test, which were both carried out in accordance with prescribed methods, namely DIN 53,799, satisfied the requirements.

It is noteworthy that not only the laminates prepared in accordance with the invention according to Item (b 1) of Example 1 but also the laminates prepared in accordance with the invention according to Item (b 2) of Example 1 are distinguished by a high degree of flexibility, for which thermoset laminates are normally not known.

(b 3) Sequence of Layers for coating chipboard
  Release paper (textured film)
  Decorative papers (a–c), resinated side facing textured film
  Regenerated paper (f), resinated side facing chipboard
  Chipboard
  Decorative papers (a–c), resinated side facing textured film
  Release paper (textured film)

Moulding conditions: 48 seconds at 160° C., measured at the decorative paper
Moulding pressure: 25 bar Result:
Coated chipboard was obtained which had a homogeneous continuous surface with firm adhesion to the chipboard. The degree of hardening was examined by means of the Kiton dyeing test, the result, which was at level 2, being within the usual range. The steam resistance test and crack resistance test, which were both carried out in accordance with prescribed methods, namely DIN 53,799 and DIN 68,765 respectively, satisfied the requirements.

Comparison:
Laminates were prepared using the layer sequences specified, except that the individual papers were treated in a known prior art manner whereby they were thoroughly impregnated with a 55% strength aqueous melamine impregnating resin solution containing added hardening agent and wetting agent and then dried to a volatile content of 6.5% (dried at 160° C. for 5 minutes).

The compression-moulding likewise took place under the abovementioned conditions.

Result:

There were no observable differences in application properties (Kiton test, steam test, crack resistance test) between the laminates prepared according to the invention from carrier webs treated with a brushable resin dispersion and the laminates prepared by conventional methods using thoroughly impregnated and dried carrier webs.

EXAMPLE 2

85 parts of a modified melamine/formaldehyde resin containing 15% of urea (molar ratio of aminoplast former to melamine=1:1.8) in powder form and 15 parts by weight of demineralised water were dispersed by means of a high-speed stirrer to give a clot-free resin dispersion. Viscosity at 23° C.: about 12,000–14,000 cp. 0.7% of the morpholine salt of para-toluenesulphonic acid, as a hardening agent, and 0.5% of a commercially available wetting agent were added to this dispersion.

The pot life of the dispersion was at 20°–25° C. about 8–10 hours. The batch described above was applied by means of a roll with doctor blade metering (100 or 150$\mu$) to the upper face of the following commercially available types of decorative paper:

(e) Core paper already finished in the course of its manufacture so as to be non-splitting
  Raw weight: 190 g/m$^2$
  Final weight, including the coat of resin dispersion: 350 g/m$^2$
(f) Regenerated paper
  Raw weight: 140 g/m$^2$ (used as an underlay film)
  Final weight, including the coat of resin dispersion: 290 g/m$^2$ The resinated papers were compression-moulded without intermediate drying together with an undried decorative paper (grade a–c) resinated as in Example 1 using the following sequence of layers:
  Platen (silk gloss) or aluminum foil or textured paper
  Decorative paper or fabric (grade a–d), resinated face upwards
  Regenerated paper (grade f)
  Core paper (grade e)
  Platen
Compression-moulding conditions:
  25 to 35 seconds at 155°–250° C., measured at the decorative paper under a moulding pressure of 25–30 bar.
Result:

Laminates were obtained which were void-free and non-splitting and has a homogeneous continuous surface. The degree of hardening was examined by means of the Kiton dyeing test, the result, which was at level 2, being within the usual range. The steam resistance test and the crack resistance test, which were both carried out in accordance with prescribed methods, namely DIN 53,799 and DIN 68,765 respectively, satisfied the requirements.

EXAMPLE 3

55 parts by weight of a modified commercially available melamine/formaldehyde short-cycle resin (molar ratio of melamine to formaldehyde=1:2.0) in powder form and 45 parts by weight of a commercially available modified melamine/formaldehyde liquid resin (molar ratio of melamine to formaldehyde=1:1.75) in the form of a 57% strength aqueous solution were dispersed by means of a high-speed stirrer to give a clot-free resin dispersion.

0.8% of the morpholine salt of para-toluenesulphonic acid, as a hardening agent, and 0.5% of a commercially available wetting agent were added to this dispersion.

The method used to apply the dispersion to the carrier webs and their further processing into laminates or coated chipboards were in accordance with sections (b1), (b2) and (b3) of Example 1.

The compression-moulded products obtained were free of voids and non-splitting and had a homogenous continuous surface. The degree of hardening was examined by means of the Kiton dyeing test, the result, which was at level 2, being within the usual range. The steam resistance and the crack resistance conformed to the requirements of DIN 53,799 and DIN 68,765 respectively.

EXAMPLE 4

55 parts by weight of a modified commercially available melamine/formaldehyde short-cycle resin (molar ratio of melamine to formaldehyde 1:1.8) in powder form and 45 parts by weight of a commercially available modified melamine/formaldehyde liquid resin (molar ratio of melamine to formaldehyde 1:1.7) in the form of a 57% strength aqueous solution were dispersed by means of a high-speed stirrer to give a clot-free resin dispersion.

0.8% of the morpholine salt of para-toluenesulphonic acid, as a hardening agent, and 0.5% of a commercially available wetting agent were added to this dispersion.

The dispersion was applied to the surface of a white decorative paper (raw weight: about 80 g/m$^2$) which, in a known process, has been impregnated with a commercially available modified melamine impregnating resin (molar ratio of melamine to formaldehyde 1:1.7) and dried. Weight after impregnating and drying: about 150 g/m$^2$.

Weight after impregnating, drying and application of dispersion: about 200 g/m$^2$.

The decorative paper thus treated was further processed into laminates or coated chipboards as in sections (b1), (b2), and (b3) of Example 1.
Result:

The laminates and coated chipboards obtained in this example were equivalent to the products of Example 1, having void-free homogeneous continuous surfaces and degree of hardening level 2. The resistance to steam, the crack resistance, and the degree of cohesion within the material (cohesion between layers) conformed to requirements.

EXAMPLE 5

80 parts of a modified commercially available melamine/formaldehyde short-cycle resin in powder form (molar ratio of melamine to formaldehyde=1:1.8) and 20 parts of demineralised water were dispersed by means of a high-speed stirrer to give a clot-free resin dispersion. Viscosity at 23° C.: about 12,000–14,000 mpa.s. 0.7% of the morpholine salt of para-toluenesulphonic acid, as a hardening agent, and 0.5% of a commercially available wetting agent were added to this dispersion.

The pot life of the dispersion at 20°–25° C. was about 8–10 hours. The batch described above was applied by means of a roll with doctor blade metering (100 or 150$\mu$) to the upper face of a layer of white folding cardboard. This cardboard had previously been prime-impregnated in a known manner using a mixture of equal parts of an acrylate dispersion and a urea impregnating resin and dried.

Raw weight of the cardboard: 210 g/m²
Weight after impregnating and drying: 300 g/m²
Total weight including the surface coat of dispersion: 380 g/m²

The single layer of cardboard was hardened in a twin-belt press under conditions such as those described in part (b2) of Example 1.

Result:

A non-splitting flexible material was obtained which had a continuous homogeneous surface. The degree of hardening was examined by means of the Kiton dyeing test, the result of which was at level 2, being within the usual range. Such a product can be processed, inter alia, to coat edge areas.

The use according to the invention of spreadable (relatively low moisture content) amino resin dispersions enables the use in industry of apparatus for preparing laminates or the like which takes up relatively little space by virtue of the fact that compression-moulding need not be preceded by an energy- and time-consuming drying step which makes use of expensive drying equipment, such as long drying ducts. A unit to carry out the invention, that is to prepare compression-moulded products using carrier webs according to the invention, which are coated with amino resin, therefore need not have a system for drying the resinated carrier webs. Such a unit according to the invention thus essentially consists of only three elements, namely (a) a unit for removing carrier webs, decorative films and base material,
(b) a coating station, and
(c) a press.

All three units can in principle be constructed in a known manner.

The specific embodiment of such a unit described below is intended to illustrate the invention and how it is carried out without, however, restricting the invention to the specific features of this embodiment.

The drawing shows, and describes in more detail, an illustrative embodiment of apparatus for the continuous production of a carrier web which is coated with amino resin in accordance with the present invention. In the drawing FIG. 1 shows a diagrammatic side view of the whole apparatus;

FIG. 2 shows a vertical section through pressure chambers of the compression-moulding belt device;

FIG. 3 shows a vertical section through a pressure chamber which is in accordance with FIG. 2, has a shut-off device, and is not under load;

FIG. 4 shows a vertical section through the same pressure chamber as in FIG. 2 under load; and FIG. 5 shows a vertical section through the same pressure chamber which has a modified shut-off device and is not under load.

10 designates an unwinding station for two uncoated carrier webs 11, 12, which comprise an upper supply roll 13 with a reserve roll 14 and a lower supply roll 15 with a reserve roll 16. The unwinding carrier webs 11, 12, one lying on top of the other, pass through pressure rolls (feed rolls) 17 and 18, which are rotatively mounted parallel and on top of each other, and of which preferably one pressure roll is driven, so that tension is exerted on the carrier webs, drawing these carrier webs from the corresponding supply rolls.

Downstream of this unwinding station is a coating unit 19 which has transfer rolls 20 and 21 and which applies to opposite surfaces of the carrier webs the spreadable amino resin dispersion according to the invention, which is temporarily stored in storage vessels 23 and 24.

This coating unit is followed at a certain short distance by on the one side (top side) an unwinding device 25, which has corresponding supply and reserve rolls 26, 27, from which a textured film 28 according to the invention is drawn off, and on the other (underside) a similar unwinding device 29, which has corresponding supply and reserve rolls 30, 31 F, from which such a film as vulcanised fibre film 28a is drawn off and, like the drawn off structured film 28, is pressed by means of further pressure rolls (feed rolls) 34, 35 onto the still liquid amino resin dispersion according to the invention.

To compression-mould the carrier webs thus coated under elevated or relatively high temperatures a compression-moulding apparatus 36 (twin-belt press) is located immediately downstream and has two continuous circulating compression-moulding belts 37, 38 which are opposite to each other and which are passed round deflection rolls 37a, 38a and exert a certain specifically high pressure on the moving carrier webs 11, 12 G, which have been coated several times, as well as on the textured film 28 and the base film 28a, compression-moulding these into a Laminate.

To ensure a particularly uniform pressure and to avoid loss of air, a large number of pressure chambers 46, 47, each with an outer fitting 39 and an inner fitting 40, has been fixed on the reverse face of each compression-moulding belt 37, 38 to a common pressure plate 41.

The outer fitting 39 and the inner fitting 40 are arranged concentrically to each other (compare FIGS. 3 and 4). There is on each compression-moulding belt 37, 38 an annular seal 42, which is held by the inner fitting 40. The seal 42 is located in accordance with FIG. 3 of the drawing in a recess of the inner fitting 40. A resilient seal ring 43 spans the gap between the inner fitting 40 and the surrounding, outer fitting 39. The inner fitting 40 together with the annular seal 42 can thus move without friction by a small amount relative to the outer fitting 39.

According to FIG. 3 of the drawing, an annular space 45, which connects the inner pressure chamber 46 to the outer pressure chamber 47, has been left free between a support 44, which has a stepped head 44a, and the inner fitting 40. The pressure transfer medium can flow via ducts 48 and 49 to the tapholes 50 of the pressure plate 41 and from there through a central bore 51 of the support 44 and via radial bores 52 of the support 44 into the inner pressure chamber 46. From there the pressure transfer medium can pass via the annular space 45 into the outer pressure chamber 47, where it presses the compression-moulding belt 37 against the workpiece.

The pressure in the inner pressure chamber 46 presses the inner fitting 40 together with the annular seal 42 against the compression-moulding belt 37. The force with which the inner fitting 40 is pressed against the compression-moulding belt 37 depends on the pressure and on the area of the inner fitting 40 which is parallel to the compression-moulding belt 37 and within the pressure chamber 46 and on which the pressure acts. This force is opposed by a force which depends on the pressure in the outer pressure chamber 47 and on the area of the inner fitting 40 on which this pressure acts.

The pressure in the outer pressure chamber 47 causes the compression-moulding belt 37 to be pressed against the workpiece.

If in the course of operation pressure transfer medium were to escape from the outer pressure chamber 47 through a gap between the seal 42 and the compression-moulding belt 37, this loss of pressure transfer medium can be replaced by pressure transfer medium flowing from the inner pressure chamber 46 through the annular space 45 into the outer pressure chamber with a certain pressure-regulating action. The air pressure in the outer pressure chamber 47 is then somewhat smaller than the pressure in the inner pressure chamber 46. In other words, should an undesirable escape of pressure transfer medium occur in the course of operation from the outer pressure chamber 47, then, due to the pressure-regulating action of the annular space 45, the pressure difference between the inner pressure chamber 46 and the outer pressure chamber 47 becomes larger, so that the force which pushes the inner fitting 40 together with the seal 42 perpendicularly onto the compression-moulding belt 37 and which is the resultant force of the pressure forces of the inner pressure chamber 46 and the outer pressure chamber 47 becomes larger.

So that in any case the force with which the inner fitting 40 is pushed towards the compression-moulding belt 37 is greater than the force with which this fitting 40 is pushed away from the compression-moulding belt 37 a helical spring 53 is mounted in the inner pressure chamber 46 in such a way that one end acts against the outer fitting 39 and the other end against the inner fitting 40. In FIG. 3 of the drawing this helical spring 53 has been given a conical design; it can also be cylindrical.

However, since frequently the pressure-regulating action of the annular space 45 is inadequate and pressure transfer medium escapes in undesirable fashion, an additional shut-off device in the form of an O-shaped, preferably resilient sealing ring 54 is mounted according to the invention between the stepped head 44a and the area 40a of the inner fitting 40 which faces the compression-moulding belt, which shut-off device seals the annular space 45 when the area 40a, which faces the compression-moulding belt, approaches the stepped head 44a, so that the pressure exerted by the inner pressure chamber 46 on the inner fitting 40 increases (compare FIG. 3).

Such a simple shut-off device enables the feed of pressure transfer medium from the inner pressure chamber 46 into the outer pressure chamber 47 to be controlled in a direct manner by the workpiece, specifically its outer contours, passing through the press.

On entry a workpiece comes into contact, with its edges, with the compression-moulding belt 37 and lifts the latter onto an area which corresponds to the surface of the moving workpiece. This has the effect of raising all inner fittings 40 of the small pressure devices (pressure chambers) located at the edges and on the surface of the moving workpiece, so that the distance between the area 40a, which faces the compression-moulding belt, and the stepped, fixed head 44a becomes larger, and hence the annular space 45 between the inner and the outer pressure chamber 46, 47 opens up (FIG. 4). Accordingly, pressure transfer medium now flowing into the outer pressure chamber 47 forces the compression-moulding belt 37 against the moving workpiece.

When the workpiece has passed through the press the rear edges of the workpiece release the inner fitting 40, so that the latter descends and the annular space 45 is re-sealed by the resilient sealing ring 54. The outer pressure chamber 47 becomes unpressurised and hence does not exert a force on the compression-moulding belt 37, which is not pushed into the free space (in the absence of a workpiece). The result is that the unfavourable escape of pressure transfer medium is avoided.

In a modified embodiment according to FIG. 5, the support 44, in addition to the bores 52 for feeding the pressure transfer medium into the inner pressure chamber 46, has further bores 55, which open and close according to the height setting of the inner fitting 40, the position of which is directly controlled by the workpiece passing through.

On entry of a workpiece the inner fitting 40 is lifted by the edge of the workpiece and unblocks the lower bores 55, so that pressure transfer medium can also flow into the outer pressure chamber 47, where, as in the illustrative example according to FIG. 4, it forces the compression-moulding belt 37 against the moving workpiece. Once the rear edge of the workpiece has passed through the inner fitting 40 descends and hence seals the bores 55. For this purpose, the inner fitting 40 can fit tightly on the support 44. If it is in practice impossible to eliminate a narrow gap between the outer walls of the support 44 and the inner fitting 40, it is advantageous and preferable to insert a sealing ring 56 into this gap, in order to avoid unintentional flow of the pressure transfer medium from the inner pressure chamber 46 into the outer pressure chamber 47.

What we claim is:

1. A carrier web coated with amino resin wherein at least one surface is resinated with a spreadable amino resin dispersion containing 70-90% by weight of a solid, modified melamine-formaldehyde resin having a melamine-formaldehyde ratio of from 1:1.5 to 1:2.2 and a water-dilutability within the range from 1:0.8 to 1:1.5 and 30-10% by weight of a liquid dispersant.

2. A carrier web coated with amino resin according to claim 1 wherein at least one surface is resinated with a spreadable amino resin dispersion containing 70-90% by weight of a solid, modified melamine-formaldehyde resin having a melamine-formaldehyde ratio of from 1:1.5 to 1:2.2 and a water-dilutability within the range from 1:0.8 to 1:1.5 and 30-10% by weight of an essentially aqueous dispersant.

3. A carrier web coated with amino resin wherein at least one surface is resinated with a spreadable amino resin dispersion containing 35-65% by weight of a solid, modified melamine-formaldehyde resin having a melamine-formaldehyde ratio of from 1:1.5 to 1:2.2 and a water-dilutability within the range from 1:0.8 to 1:1.5 and 65-35% by weight of an aqueous liquid ressin, the melamine-formaldehyde ratio of from 1:1.5 to 1:2.2 and the water-dilutability of 1:0.8 to 1:1.5.

4. The process for preparing a coated carrier web according to claim 1 which comprises contacting at least one surface of a web with a spreadable amino resin dispersion containing 70-90% by weight of a solid, modified melamine-formaldehyde resin having a melamine-formaldehyde ratio of from 1:1.5 to 1:2.2 and a water-dilutability within the range from 1:0.8 to 1:1.5 and 30-10% by weight of a liquid dispersant.

* * * * *